United States Patent [19]

Matsubara

[11] Patent Number: 4,526,040
[45] Date of Patent: Jul. 2, 1985

[54] OSCILLATION COMPENSATING APPARATUS FOR VORTEX FLOW METER

[75] Inventor: Naoki Matsubara, Tokyo, Japan

[73] Assignee: Oval Engineering Co., Ltd., Tokyo, Japan

[21] Appl. No.: 515,090

[22] Filed: Jul. 18, 1983

[30] Foreign Application Priority Data

Jul. 22, 1982 [JP] Japan ............................ 57-126732

[51] Int. Cl.³ .............................. G01F 1/32
[52] U.S. Cl. .................... 73/861.24; 73/DIG. 4
[58] Field of Search ......... 73/861.22, 861.24, DIG. 4, 73/861.21

[56] References Cited

U.S. PATENT DOCUMENTS

| 4,186,599 | 2/1980  | Frick           | 73/861.24 |
| 4,270,391 | 6/1981  | Herzl           | 73/861.22 |
| 4,362,061 | 12/1982 | Yokogawa et al. | 73/861.24 |
| 4,437,350 | 3/1984  | Tamura et al.   | 73/861.24 |

FOREIGN PATENT DOCUMENTS 0141352 4/1980 German Democratic Rep. ............................ 73/861.24

Primary Examiner—Charles A. Ruehl
Attorney, Agent, or Firm—Jordan and Hamburg

[57] ABSTRACT

In a vortex flow meter for measuring a varying flow rate of a fluid through a conduit, an oscillation compensating apparatus is constructed to remove undesirable externally derived oscillation noise which is applied to the flow meter. An elongate vortex shedding member extends into the conduit through part of its wall. The shedding member forms a shedding portion inside the conduit and a compensating portion outside the conduit. The shedding portion carries a first oscillation sensor therewith and the compensating portion, a second oscillation sensor. The first sensor is sensitive to an oscillation component caused in the shedding portion by a vortex train shed in the conduit, and an externally derived oscillation noise component. The second sensor is sensitive to the noise component only. All these sensed components are combined to cancel the oscillation noise so that only the oscillation component in the shedding portion is picked up.

23 Claims, 8 Drawing Figures

OSCILLATION COMPENSATING APPARATUS FOR VORTEX FLOW METER

BACKGROUND OF THE INVENTION

The present invention relates to an oscillation compensating apparatus for a vortex flow meter.

One approach to the measurement of a flow rate of a fluid is, as well known in the art, a vortex flow meter which includes a vortex shedding member disposed in a fluid passage or conduit. With this type of flow meter, an instantaneous flow rate of a fluid flowing through the conduit is measured in terms of frequency of oscillations of the vortex shedding member which results from the Kármán vortex street, or vortex train, shed in the conduit downstream of the vortex shedding member.

A problem has existed in the vortex flow meter in that a sensor thereof sensitive to the oscillations of the vortex shedding member, or shedder, picks up not only oscillations due to the vortex train but various kinds of externally derived oscillations, thereby making accurate flow rate measurement difficult. Sources of the externally derived oscillations include a pump for compressing the fluid and a damper which is mechanically opened and closed. Implementations for solving this problem are disclosed in Japanese Utility Model Laid-Open Publication Nos. 57-19465/1982 and 57-28370/1982 for example, which are characterized by the use of two oscillation sensors. The output of one of the two sensors is employed to automatically control the triggering level of a Schmitt trigger or, alternatively, the outputs of both sensors are combined with each other. However, such implementations are not fully acceptable from the viewpoint of their applicable flow rate range, because the two sensors located at different positions which make noise signals picked up thereby different in waveform or because strict adjustment is required in positioning the sensors.

SUMMARY OF THE INVENTION

It is therefore an object of the present invention to provide an oscillation compensating apparatus for a vortex flow meter which effectively eliminates oscillation noise propagating through a conduit to pick up only expected oscillations of a vortex shedding member caused by a fluid.

It is another object of the present invention to provide an oscillation compensating apparatus for a vortex flow meter which features a simple construction and high performance.

It is another object of the present invention to provide a generally improved oscillation compensating apparatus for a vortex flow meter.

In a vortex flow meter for measuring a flow rate of a fluid which flows through a conduit, an oscillation compensating apparatus for removing externally derived oscillation noise applied to the flow meter of the present invention includes an elongate vortex shedding member extending into the conduit through part of a wall of the conduit. The vortex shedding member has a shedding portion constituted by a portion thereof located inside the conduit and a compensating portion constituted by a portion thereof located outside the conduit. First oscillation sensor means is disposed in the shedding portion for sensing an oscillation component caused in the shedding portion by a vortex train and the externally derived oscillation noise, and outputs a first signal having a frequency which corresponds to the oscillation and noise components. Second oscillation sensor means is disposed in the compensating portion for sensing only the noise component and outputs a second signal having a frequency which corresponds to the noise component.

The above and other objects, features and advantages of the present invention will become apparent from the following detailed description taken with the accompanying drawings.

DESCRIPTION OF THE PREFERRED EMBODIMENTS

While the oscillation compensating apparatus for a vortex flow meter of the present invention is susceptible of numerous physical embodiments, depending upon the environment and requirements of use, substantial numbers of the herein shown and described embodiments have been made, tested and used, and all have performd in an eminently satisfactory manner.

Figure 1:
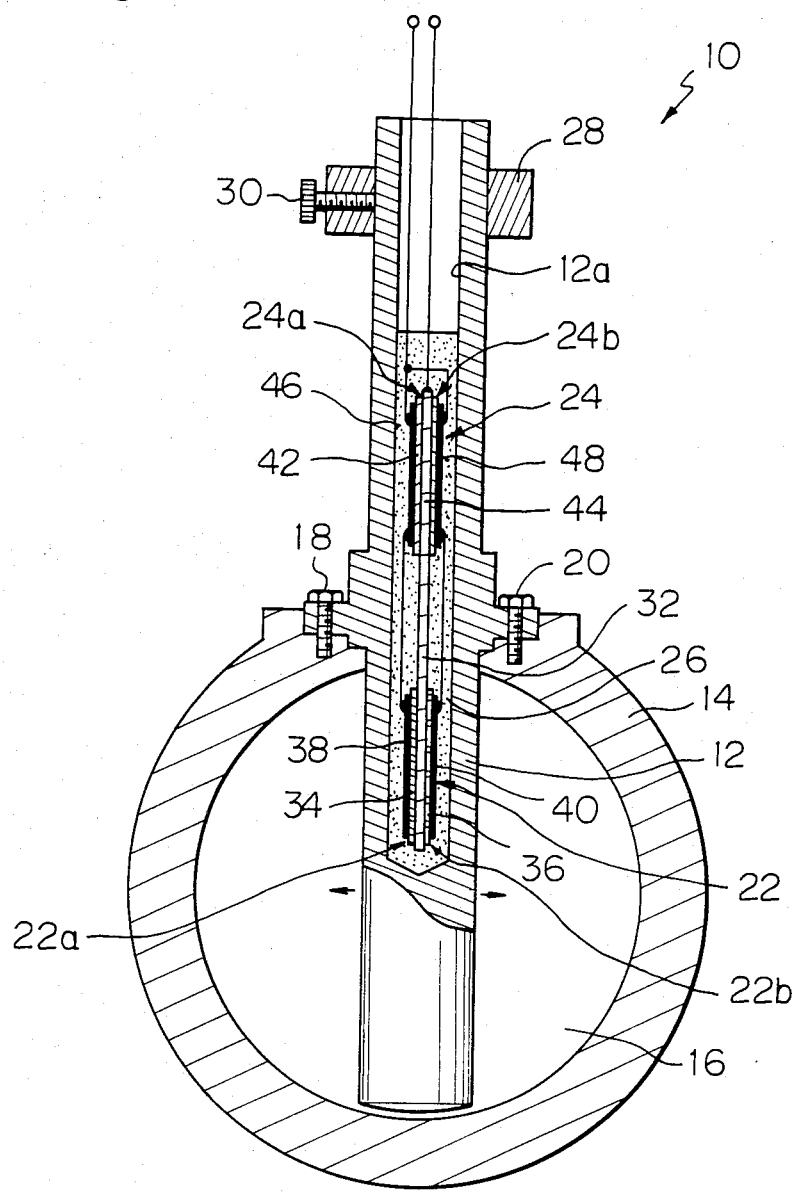
FIG. 1 is a sectional view of a vortex flow meter which employs an oscillation compensating apparatus embodying the present invention.

Referring to FIG. 1 of the drawings, there is shown a vortex flow meter furnished with a vibration compensating apparatus 10 embodying the present invention. An elongate vortex shedding member 12 extends into a conduit 14 through which a fluid 16 is allowed to flow. The vortex shedder 12, having a triangular cross-section for example, is rigidly mounted to the wall of the conduit 14 by means of screws 18 and 20. A bore 12a extends axially through the vortex shedder 12 from the top toward the bottom and accommodates thereinside a first oscillation sensor 22 inside of the conduit 14 and a second oscillation sensor 24 outside of the same. The first and second oscillation sensors 22 and 24 are rigidly confined together in the bore 12a by a glass envelope 26. A balance weight 28 is coupled over the vortex shedder 12 adjacent to the outermost end of the latter. The position of the balance weight 28 relative to the element 12 is controllable as desired by means of an adjusting screw 30.

The first sensor 22 comprises a flat base plate 32 made of metal and extending substantially along the axis of the bore 12a, a pair of piezoelectric elements 34 and 36 rigidly mounted on opposite sides of the base plate 32, and metal electrodes 38 and 40 respectively deposited on the piezoelectric elements 34 and 36 as by evaporation or gold paste baking. While sharing the base plate 32 with the first sensor 22, the second sensor 24 comprises a pair of piezoelectric elements 42 and 44 individually fixed to opposite sides of the base plate 32, and metal electrodes 46 and 48 respectively deposited on the piezoelectric elements 42 and 44. In this construction, a piezoelectric sensor 22a is formed by the base plate 32, piezoelectric element 34 and electrode 38 in the first sensor 22. Another piezoelectric sensor 22b, which faces the sensor 22a, is formed by the base plate 32, piezoelectric element 36 and electrode 40. Likewise, the second sensor 24 has a piezoelectric sensor 24a formed by the base plate 32, piezoelectric element 42 and electrode 46, and another piezoelectric sensor 24b formed by the base plate 32, piezoelectric element 44 and electrode 48, the piezoelectric sensors 24a and 24b being located to face each other.

The first and second sensors 22 and 24 having the above construction are installed in the axial bore 12a of the vortex shedder 12 such that the electrodes 38 and 40 and the electrodes 46 and 48 face each other each in a direction perpendicular to the flow direction of the fluid 16 in the conduit 14. Stated another way, as shown in FIG. 1, the electrodes 38 and 40 are located face-to-face in symmetrically with respect to the base plate 32 and so are the electrodes 46 and 48, as viewed from the upstream or downstream side with respect to the fluid flow.

The glass envelope 26 retaining the sensors 22 and 24 inside the bore 12a functions in three ways: completely insulating the sensors from the surrounding elements, causing the sensors to oscillate in a unitary structure with the vortex shedder 12, and enhancing the resistivity of the sensors to heat. Therefore, so long as these functions are satisfied, the envelope 26 may be made of resin, ceramic or the like, instead of glass.

Figure 2:
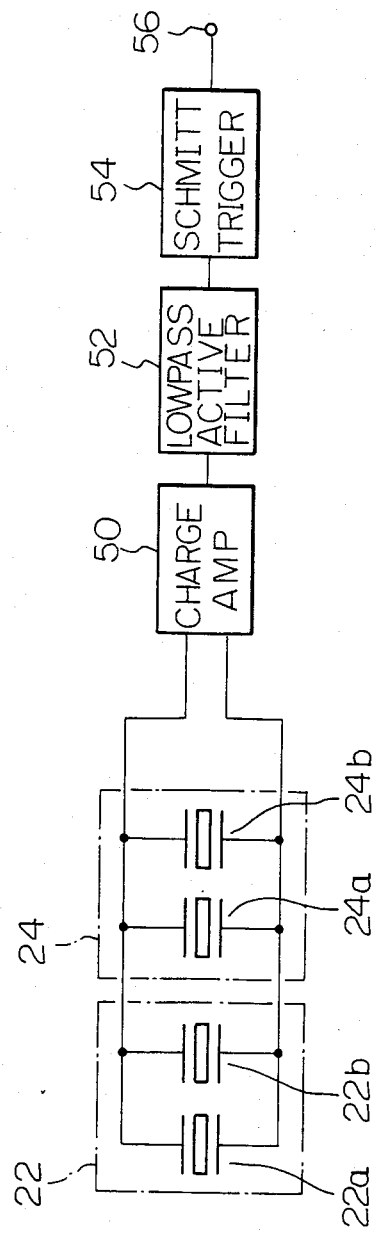
FIG. 2 is a block diagram of an exemplary electrical arrangement of the apparatus shown in FIG. 1.

Referring to FIG. 2, there are shown electrical connections of the sensor made up of the piezoelectric sensors 22a and 22b and the sensor made up of the piezoelectric sensors 24a and 24b, and a circuit arrangement for processing outputs of the two sensors to remove noise components therefrom. As shown, the output signals of the first and second sensors 22 and 24 are sequentially processed by a charge amplifier 50, a low-pass active filter 52 and a Schmitt trigger 54. A pulse signal appears at an output terminal 56.

In operation, when the fluid 16 flows through the conduit 14, a vortex train is shed in a known manner in a position downstream of that part of the vortex shedder 12 located inside of the conduit 14 (this part will be referred to as the "shedding portion" hereinafter). The vortex train causes the shedding portion of the vortex shedder 12 to oscillate substantially perpendicular to the flow of the fluid through the conduit 14, that is, in the lateral direction as seen in FIG. 1. The piezoelectric sensors 22a and 22b of the first sensor 22, which is integral with the vortex shedder 12 as mentioned earlier, sense the oscillations to deliver a signal proportional to the oscillation frequency. Here, due to the common interconnection of the piezoelectric sensors 22a and 22b, their output levels are added to each other. However, the problem is that the output signal of the first sensor 22 is entraining noise due to external oscillations which propagate through the conduit 14, in addition to the expected oscillations due to the vortex train. In detail, because the piezoelectric sensors 22a and 22b of the first sensor 22 face each other in the direction perpendicular to the fluid flow, they are hardly sensitive to oscillations parallel to the fluid flow and, if sensitive, the resulting outputs would cancel each other to not constitute any noise due to the differential interconnection of the electrodes. However, when it comes to externally derived oscillations of the conduit 14 perpendicular to the fluid flow and vortex shedder 12, they are allowed to reach the shedding portion of the shedder 12 to be detected together with the oscillations caused by the vortex train.

Meanwhile, the second sensor 24 is adapted to sense only the external oscillations which are transferred through the conduit 14. As previously mentioned, the vortex shedder 12 is firmly fastened to the conduit 14 by means of the screws 18 and 20 so that the oscillation of the shedding portion of the shedder 12 is prevented from propagating outwardly beyond the fastened position to the remaining outer portion of the shedder 12 (this portion will be referred to as the "compensating portion" hereinafter). The second sensor 24, therefore, is immune to oscillation except for those which are introduced into conduit 14 from the outside. It will be noted that the second sensor 24 is common to the first 22 in sensing only the oscillations in the direction perpendicular to the fluid flow and shedder 12.

Figure 3:
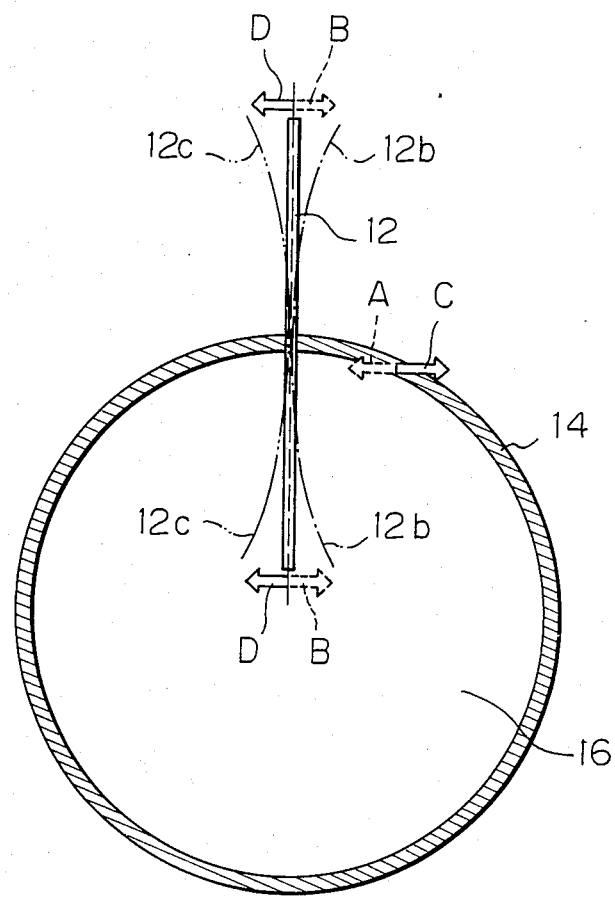
FIG. 3 is a diagram demonstrating the principle of operation of the apparatus in accordance with the present invention.

Now, consideration will be given to oscillations of the vortex shedder 12 originating from external oscillations which propagate through the conduit 14, with particular reference to FIG. 3. In response to a leftward oscillation indicated by a dotted arrow A, both the shedding and compensating portions of the shedder 12 bend themselves to the right in the drawing as indicated by dotted arrows B, each fulcrumed by the interconnected portion of the shedder 12 and conduit 14. The resulting position of the shedder 12 is indicated by a dash-and-dot line 12b in the drawing. In response to a righward oscillation indicated by a solid arrow C, on the other hand, both the shedding and compensating portions of the shedder 12 bend to the left to a position indicated by a dash-and-dots line 12c. Therefore, the first and second sensors 22 and 24 translate an external oscillation into a same waveform. Concerning the second sensor 24, however, it senses the composite oscillations of oscillations due to external oscillations and oscillations due to the vortex train.

With the above principles in mind, if the first and second sensors 22 and 24 are held in differential interconnection, the output of the second sensor 24 will cancel a noise component in the output of the first sensor 22 thereby leaving only the signal resulted from the vortex train. Because the sensors 22 and 24 are high impedance elements, their outputs are transformed into voltage variations by the charge amplifier 50. The low-pass active filter 52 removes from the voltage variations high frequency components which have no bearing on the oscillations of the vortex shedder 12. The Schmitt trigger 54 processes an output of the filter 52 into a rectangular pulse signal which accurately reflects an oscillation frequency provided by the vortex train only. Counting the output pulses of the Schmitt trigger 54 provides any instantaneous flow rate of the fluid 16.

The unique construction described, in which two sensors 22 and 24 are commonly installed in the shedder 12, affords the following advantage. Where one of the sensors is located inside the conduit 14 and the other outside the same, they receive exactly the same external oscillations and thereby pick up noise signals from the conduit 14 as exactly the same waveforms regardless of the direction or the like of the oscillations. As a result, a noise component will be completely cancelled when outputs of the sensors 22 and 24 are combined with each other. Where the fluid 16 is a liquid and, therefore, the shedding portion of the shedder 12 is in the liquid and the compensating portion in air, the oscillation modes of the shedding and compensating portions will differ from each other. Another factor that brings about a difference between their oscillation modes is derived externally, e.g., a difference in mass and/or shape between them. Any such difference in oscillation mode between the two portions can be readily eliminated by shifting the balance weight 28 to a desired position on the element 12.

Figure 4:
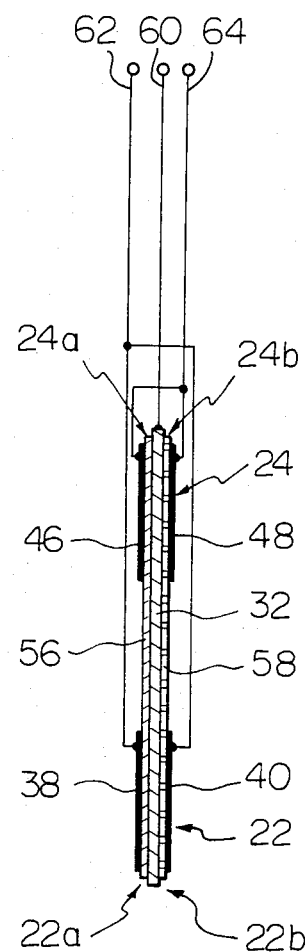
FIG. 4 is a sectional view of an alternative oscillation sensor construction in accordance with the present invention.

Referring to FIG. 4, a modification to the sensor assembly of FIG. 1 is illustrated. In FIG. 4, the same reference numerals as those of FIG. 1 designate the same structural elements. While in FIG. 1 the piezoelectric elements 34 and 36 of the first sensor 22 are physically independent of their adjacent counterparts 42 and 44 of the second sensor 24, in FIG. 4 the adjacent piezoelectric elements are replaced by a pair of common piezoelectric elements 56 and 58. A terminal 60 is led out from the metal base plate 32; a terminal 62 is led out from the electrodes 38 and 40 which are respectively associated with the elements 56 and 58 of opposite polarities; and a terminal 64 is led out from the electrodes 46 and 48 which are respectively associated with the elements 56 and 58 of opposite polarities.

Figure 5:
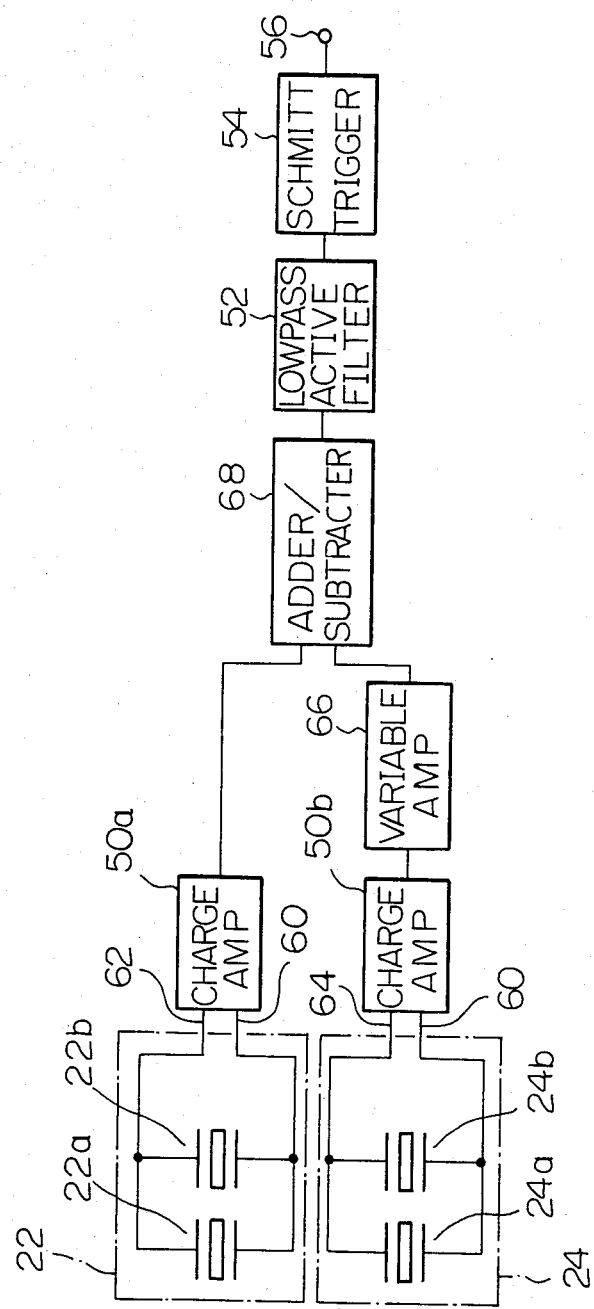
FIG. 5 is a block diagram of an electrical circuit associated with the sensor construction of FIG. 4.

A circuit for processing outputs of the sensors 22 and 24 of FIG. 4 is shown in FIG. 5, in which the same reference numerals as those of FIG. 2 designate the same structural elements. In FIG. 5, the circuit includes a charge amplifier 50a connected to the output terminals 60 and 62 of the first sensor 22, a second charge amplifier 50b connected to the output terminals 60 and 64 of the second oscillation sensor 24, a variable amplifier 66, and an adder or subtractor 69. For the reason which will follow, the circuit of FIG. 5 will prove effective when the output level of the first sensor 22 differs from that of the second 24. Although the waveform of noise included in the output of the first sensor 22 is in principle the same as the waveform of the output of the second sensor 24 as already discussed, a difference sometimes develops between the two output levels due to a difference in amplitude or the like between the inner and outer portions of the shedder 12. To eliminate this, the circuit of FIG. 5 allows the output of the amplifier 66 and thereby that of the second sensor 24 to be adjusted such that the second sensor output reaches a same level as the first sensor output, which is provided through the charge amplifier 50a. Then, the first and second sensor outputs will be combined by the adder or subtractor 69 to remove the noise component.

It should be noted in FIG. 5 that the low-pass active filter 52 and Schmitt trigger 54 individually function in the same manner as those described with reference to FIG. 2.

Figure 6:
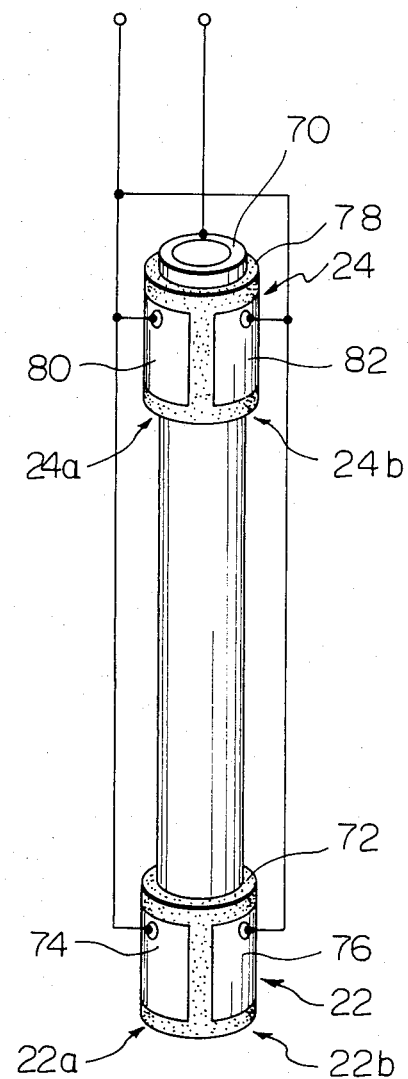
FIGS. 6-8 are perspective views of other alternative oscillation sensor constructions.

Referring to FIG. 6, a cylindrical sensor assembly is shown as an alternative to the configuration of FIG. 1 or 4. In FIG. 6, the same reference numerals as those of FIG. 1 or 4 designate the same structural elements. The first sensor 22 shown in FIG. 6 comprises a cylindrical metal tube 70, an annular piezoelectric element 72 mounted on the tube 70, and a pair of metal electrodes 74 and 76, which are individually deposited on the piezoelectric element 72 as by evaporation or gold paste baking in such a manner as to oppose each other. The second sensor 24 shares the metal tube 70 with the first sensor 22 and has, in addition thereto, an annular piezoelectric element 78 fit around the tube 70, and a pair of metal electrodes 80 and 82 deposited on the element 78 in the same manner as the electrodes 74 and 76. The tube 70, piezoelectric element 72 and electrode 74 constitute one piezoelectric sensor 22a in combination, while the tube 70, piezoelectric element 72 and electrode 76 constitute another piezoelectric sensor 22b which faces the piezoelectric sensor 22a. Further, the tube 70 cooperates with the piezoelectric element 78 and electrode 80 to form one piezoelectric sensor 24a, while cooperating with the piezoelectric element 78 and electrode 82 to form another piezoelectric sensor 24b, which faces the piezoelectric sensor 24a. Again, the orientation of the sensor assembly inside the element 12 is such that the electrodes 74 and 76 and the electrodes 80 and 82 face each other each in a direction perpendicular to the flow direction of the fluid 12 in the conduit 14. Stated another way, as in the case of FIG. 1, the electrodes 74 and 76 located face-to-face in the lateral direction and so are the electrodes 80 and 82, as seen from the upstream or downstream side with respect to the fluid flow.

Figure 7:
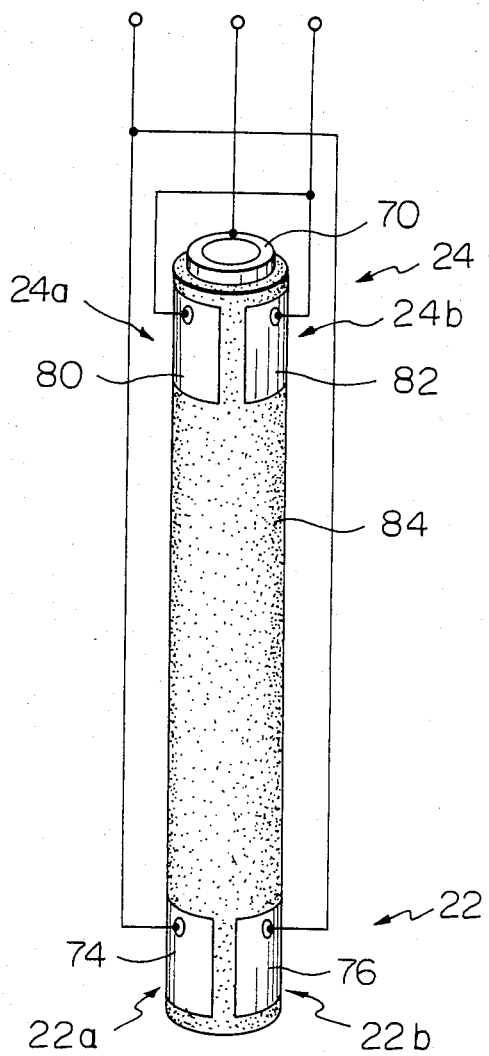

Shown in FIG. 7 is a modification to the sensor assembly of FIG. 6. In FIG. 7, a piezoelectric element 84 covers the whole outer periphery of the metal tube 70, in contrast to the spaced piezoelectric elements 72 and 78 of FIG. 6. The electrodes 74 and 76 constituting the first sensor 22 are carried on one axial end of the piezoelectric element 84, while the metal electrodes 80 and 82 constituting the second sensor 24 are carried on the other axial end of the same.

Figure 8:
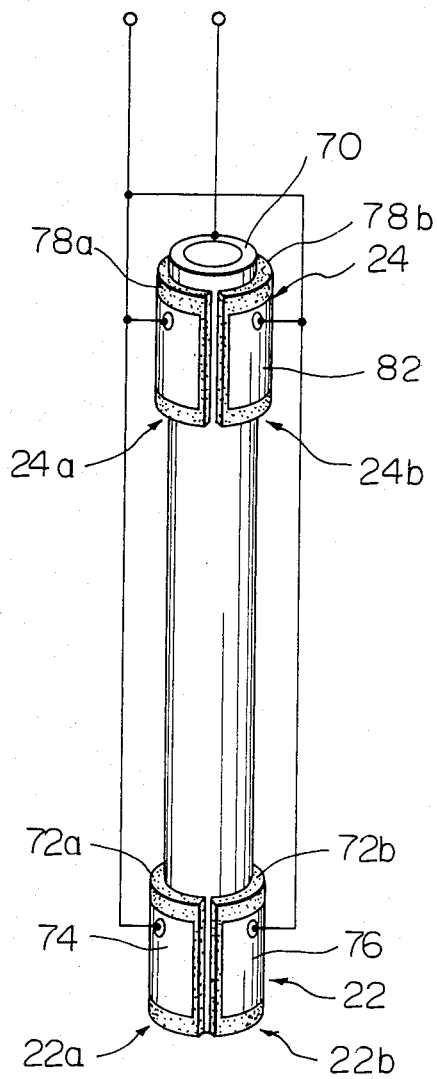

Still another modification to the cylindrical sensor configuration, particularly to that of FIG. 6, is shown in FIG. 8. A pair of spaced piezoelectric elements 72a and 72b are mounted on one end of the metal tube 70 and a pair of spaced piezoelectric elements 78a and 78b on the other end. That is, the piezoelectric element pair 72a-72b is a divided version of the piezoelectric element 72 of FIG. 6 and the piezoelectric element pair 78a-78b, that of the piezoelectric element 78.

The circuits shown in FIGS. 2 and 5 are selectively usable for processing output signals of the cylindrical oscillation sensor assemblies shown in FIGS. 6–8, just as they are used for the others.

Now, an oscillation sensor using a piezoelectric element or the like has to have its electrode portions perfectly insulated from the surrounding members by means of glass or the like. This has heretofore been implemented by a method which fills the space concerned with glass powder and then heats the glass to melt and harden it, or a method which fills the space with a preformed glass. The problem encountered with the use of glass powder is that the filling and heating procedure has to be repeated several times because the volume of glass is smaller in the hardened state after heating than in the initial powdery state. The method using a preformed glass invites an increase in cost due to the intricate structure required therefor. In contrast, any one of the cylindrical sensor configurations shown in FIGS. 6–8 will facilitate the procedure for fixing the sensors within the vortex shedding member 12. That is, it is possible to insert, melt and harden a cylindrical glass tube or preformed glass in the annular space between the wall of the bore 12a in the shedder 12 and the outer periphery of the sensors. This enveloping procedure does not need to be repeated inasmuch as the volume of the glass tube or preformed glass is free from reduction after hardening. Even the use of a preformed glass is cost-effective due to the simply cylindrical sensor configuration.

In summary, it will be seen that the present invention provides an oscillation compensating apparatus for a vortex flow meter which offers an excellent signal-tonoise ratio despite its simple and easy-to-produce structure.

Various modifications will become possible for those skilled in the art after receiving the teachings of the present disclosure without departing from the scope thereof. For example, various other designs are applicable concerning the shape of the vortex shedding member 12, fixing means therefor, means for fixing the sensors inside the shedder 12, configurations of the piezoelectric elements and electrodes of the sensors, circuit arrangement for combining the outputs of the sensors, etc. The sensors 22 and 24 may comprise physically separate members which are individually nested in the shedder 12, instead of the integral structure on a single base plate or a tube shown and described.

What is claimed is:

1. In a vortex flow meter for measuring the flow rate of a fluid which flows through a conduit, an oscillation compensating apparatus for removing externally derived oscillation noise applied to the flow meter, comprising:
   an elongate vortex shedding member extending into the conduit through part of a wall of the conduit, said vortex shedding member having a shedding portion constituted by a portion thereof located inside the conduit and a compensating portion constituted by a portion thereof located outside the conduit;
   first oscillation sensor means disposed in the shedding portion for sensing an oscillation component caused in the shedding portion by a vortex train and the externally derived oscillation noise, and outputting a first signal having a frequency which corresponds to the oscillation and noise components; and
   second oscillation sensor means disposed in the compensating portion for sensing only the noise component and outputting a second signal having a frequency which corresponds to the noise component;
   said vortex shedding member being in the form of a cylinder having a bore thereinside, one end of which is closed;
   each of the first and second oscillation sensor means comprising elongate base electrode means extending in said bore along the axis of the vortex shedding member.

2. The oscillation compensating apparatus as claimed in claim 1, further comprising circuit means for combining the first and second signals to remove the noise component and pick up only the oscillation component in the shedding portion, and outputting a third signal which corresponds to the oscillation component.

3. The oscillation compensating apparatus as claimed in claim 1, in which the first and second oscillation sensor means are rigidly confined by an insulating member in the bore at positions which correspond to the shedding and compensating portions, respectively.

4. The oscillation compensating apparatus as claimed in claim 3, in which the insulating member comprises a glass.

5. The oscillation compensating apparatus as claimed in claim 3, in which the insulating member comprises a preformed glass.

6. The oscillation compensating apparatus as claimed in claim 3, in which the insulating member comprises a resin.

7. The oscillation compensating apparatus as claimed in claim 3, in which the insulating member comprises a ceramic.

8. The oscillation compensating apparatus as claimed in claim 1, in which each of the first and second oscillation sensor means further comprises a piezoelectric member mounted on an outer periphery of said base electrode means, and sensor electrode means mounted on an outer periphery of said piezoelectric member.

9. The oscillation compensating apparatus as claimed in claim 8, in which the base electrode means comprises a flat base plate made of metal.

10. The oscillation compensating apparatus as claimed in claim 8, in which the base electrode means comprises a cylindrical tube made of metal.

11. The oscillation compensating apparatus as claimed in claim 8, in which the piezoelectric members of the first and second oscillation sensor means comprise an integral common piezoelectric element.

12. The oscillation compensating apparatus as claimed in claim 8, in which the piezoelectric members of the first and second oscillation sensor means are physically separated from each other and located only in the vicinity of the shedding and compensating portions, respectively.

13. The oscillation compensating apparatus as claimed in claim 8, in which the sensor electrode means comprises a pair of metal electrodes which are individually securely mounted on the piezoelectric member in such a manner as to face each other in a direction perpendicular to a direction of fluid flow in the conduit.

14. The oscillation compensating apparatus as claimed in claim 13, in which the metal electrodes are deposited by evaporation on the piezoelectric member.

15. The oscillation compensating apparatus as claimed in claim 13, in which the metal electrodes are deposited by gold paste baking on the piezoelectric member.

16. The oscillation compensating apparatus as claimed in claim 13, in which each of the first and second oscillation sensor means comprises a first piezoelectric sensor made up of one of the pair of metal electrodes and the piezoelectric member, and a second piezoelectric sensor made up of the other metal electrode and the piezoelectric member.

17. The oscillation compensating apparatus as claimed in claim 13, further comprising a first output terminal connected to the base electrode means and a second output terminal connected to the sensor electrodes.

18. The oscillation compensating apparatus as claimed in claim 16, further comprising a first output terminal connected to the base electrode means and a second output terminal connected to all the piezoelectric sensors of the first and second oscillation sensor means.

19. The oscillation compensating apparatus as claimed in claim 18, further comprising a charge amplifier connected to the first and second output terminals to transform an output of the base electrode means and an output of the piezoelectric sensor into a voltage variation, a low-pass filter for cutting off a high frequency component which is included in an output voltage of the charge amplifier and has no bearing on the oscillations of the vortex shedding member, and a Schmitt trigger for transforming an output voltage of the low-pass filter into a pulse signal having a rectangular waveform.

20. The oscillation compensating apparatus as claimed in claim 16, further comprising a first output terminal connected to the base electrode means, a second output terminal connected commonly to the first and second piezoelectric sensors of the first oscillation sensor means, and a third output terminal connected commonly to the first and second piezoelectric sensors of the second oscillation sensor means.

21. The oscillation compensating apparatus as claimed in claim 20, further comprising a first charge amplifier connected to the first and second output terminals to transform an output of the base electrode means and outputs of the first and second piezoelectric sensors of the first oscillation sensor means into a voltage variation, a second charge amplifier connected to the first and third output terminals to transform an output of the base electrode means and outputs of the first and second piezoelectric sensors of the second oscillation sensor means into a voltage variation, a variable output level amplifier for making a level of an output voltage of the second charge amplifier equal to a level of an output voltage of the first charge amplifier, an adder-subtractor for processing an output voltage of the first charge amplifier and an output voltage of the variable output level amplifier, a low-pass filter for cutting off a high frequency component which is included in an output voltage of the adder-subtractor and has no bearing on the oscillation of the shedding portion, and a Schmitt trigger for converting an output of the low-pass filter into a pulse signal having a rectangular waveform.

22. In a vortex flow meter for measuring a flow rate of a fluid which flows through a conduit, an oscillation compensating apparatus for removing externally derived oscillation noise applied to the flow meter, comprising:

an elongate vortex shedding member extending into the conduit through part of a wall of the conduit, said vortex shedding member having a shedding portion constituted by a portion thereof located inside the conduit and a compensating portion constituted by a portion thereof located outside the conduit;

first oscillation sensor means disposed in the shedding portion for sensing an oscillation component caused in the shedding portion by a vortex train and the externally derived oscillation noise, and outputting a first signal having a frequency which corresponds to the oscillation and noise components;

second oscillation sensor means disposed in the compensating portion for sensing only the noise component and outputting a second signal having a frequency which corresponds to the noise component; and adjusting means for varying a characteristic oscillation frequency of the compensating portion.

23. The oscillation compensating apparatus as claimed in claim 22, in which the adjusting means comprises a balance weight which is mounted on the compensating portion to be movable along an axis of the vortex shedding member.

* * * * *